Nov. 3, 1964    J. B. SWETT    3,155,267
MEAT KEEPER AND TRAY

Filed Feb. 8, 1962    2 Sheets-Sheet 1

INVENTOR.
JAMES B. SWETT
BY Harold P. Beck
ATTORNEY

INVENTOR.
JAMES B. SWETT
BY Harold R. Beck
ATTORNEY

3,155,267
MEAT KEEPER AND TRAY

James B. Swett, Barrington, R.I., assignor to Rexall Drug and Chemical Company, Los Angeles, Calif., a corporation of Delaware
Filed Feb. 8, 1962, Ser. No. 172,007
2 Claims. (Cl. 220—17)

My invention is directed to a roast keeper and tray for storing perishables. It is known to place perishables in a container, cover the top with a sealing material such as wax paper or aluminum foil, and store the container in a refrigerator. The sealing material normally does not provide an effective moisture barrier and thus the perishable is quickly dehydrated in the refrigerator. When desired the container is removed from the refrigerator, the sealing material is removed and the perishable is taken out of the container by hand or with a fork. My invention is directed to a combination keeper and tray wherein the keeper is sealable to provide an effective moisture barrier for the keeper contents and the tray is uniquely constructed to fit within the keeper such that the perishable is untouched by human hands between usages. My keeper maintains the contents fresh and free from undesirable odors and tastes.

The tray of my invention has flexible handles which permit moving of the handles from a position over the perishable on the tray to a position where the handles will not obstruct the removal of the perishable from the tray. My tray also provides a convenient surface for carrying the contents on the tray.

My invention is particularly directed to the storage of meat, roasts, ham and the like wherein substantial portions of the perishable are normally unconsumed at a single meal and thus require storage for a short period of time prior to subsequent use.

In the drawings I have shown a present preferred embodiment of my invention in which.

Briefly the present invention is directed to a keeper having a side wall and an integral bottom wall with an open top closed by a seal having a central wall with a peripheral sealing rim engageable with the top edge of the side wall. The keeper preferably has handles at each end and a peripheral reinforcing rib extending around the outer surface of the side wall.

The tray is positionable in the keeper and includes a substantially flat portion having a peripheral upstanding wall and a handle at each end for raising and lowering the tray within the keeper. The tray has raised ridges which maintain the contents above the flat surface of the tray and out of any juices or the like which may drip from the contents. The ridges also permit free circulation of cold air about the underside of the tray contents. The upstanding peripheral rim of the tray maintains the juices within the tray thereby providing a collection tray for the juices.

Preferably the tray has downwardly extending legs which seat in predetermined locations in the bottom of the keeper.

Figure 1:
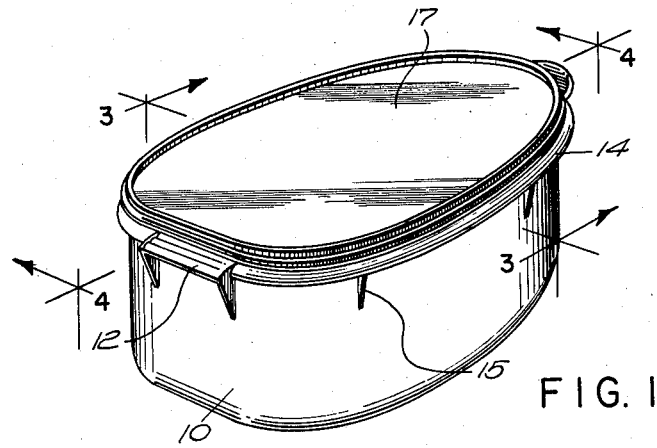
FIGURE 1 is a perspective of my keeper in sealed condition with the tray positioned within the keeper.
Figure 2:
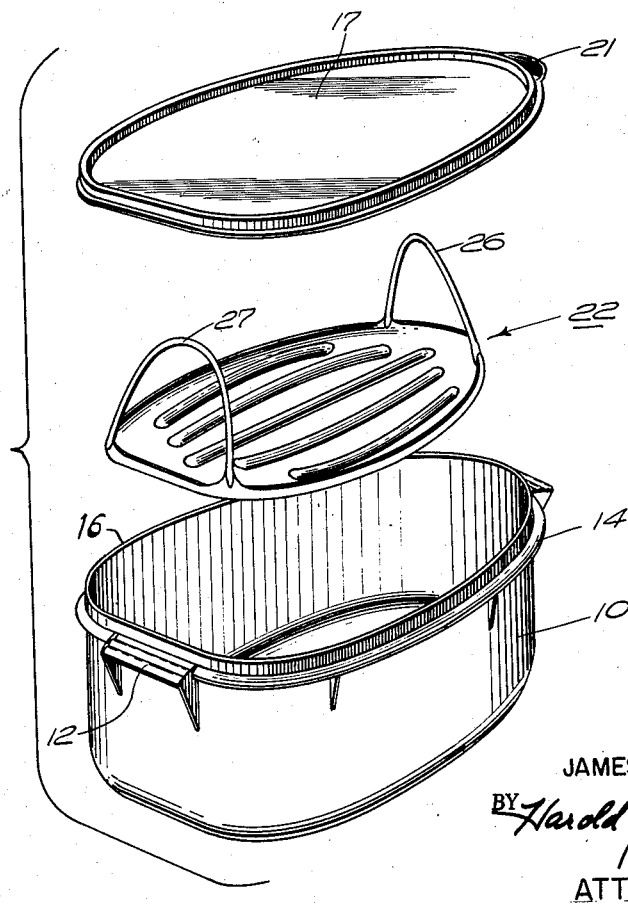
FIGURE 2 is an exploded perspective of my keeper and tray.
Figure 3:
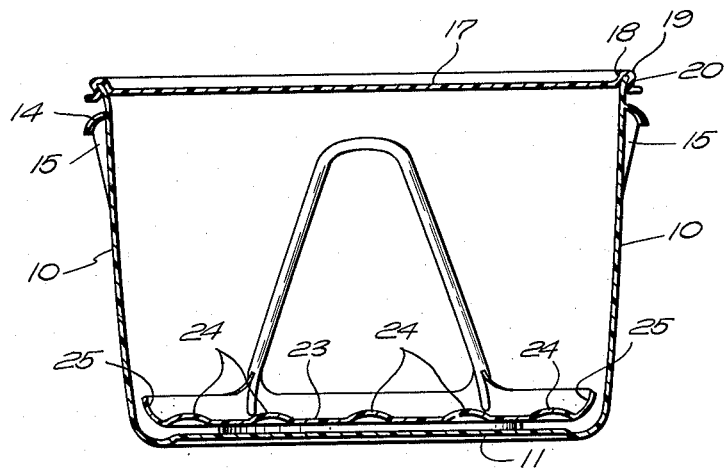
FIGURE 3 is a vertical cross-section taken on line 3—3 of FIGURE 1.
Figure 4:
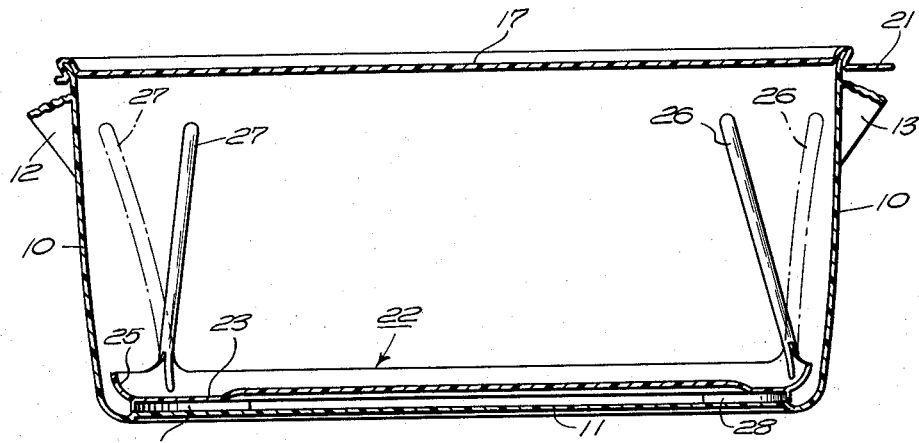
FIGURE 4 is a vertical cross-section taken on line 4—4 of FIGURE 1.
Figure 5:
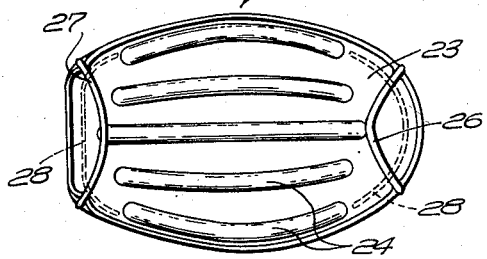
FIGURE 5 is a plan view of the tray of my invention.

Referring specifically to the drawings, the keeper includes a continuous side wall 10, preferably formed in an oval or oblong shape, and an integral bottom wall 11 which is raised in the central portion as shown in FIGURES 3 and 4. The raised central portion of the bottom wall 11 permits free flow of cold air along the bottom wall to accelerate cooling of the contents of the keeper. The juncture between the walls 10 and 11 is rounded to permit easy cleaning of the inside surface of the keeper.

A handle 12 and 13 is affixed to each end of the keeper. The handle includes a substantially flat portion extending outwardly and downwardly from the side wall 10 and a pair of gusset plates supporting the handle in rigid position relative to the side wall 10. The top surface of the handle is rippled for decorative purposes and to insure positive manual handling.

Integral with the side wall 10 is an outwardly and downwardly extending reinforcing flange 14 which extends around the entire periphery of the side wall 10 with the exception of the area of the handles 12 and 13. The flange 14 is reinforced by integral underlying gusset plates 15 at various locations around the periphery.

The upper edge of the side wall 10 is preferably flared as 16 for attachment of the seal to be described hereinafter.

The top seal includes a central, flat wall 17 having a peripheral sealing rim. The rim has an inside upstanding wall 18, a connecting wall 19 and an outside downwardly directed rim wall 20. Rim wall 20 has an outwardly directed flange for gripping the seal during removal from the wall 10. The walls 18, 19 and 20 form an inverted U-shaped seal which fits over the upper flared portion 16 of the side wall 10 and provides a tight intimate contact between the inside surfaces of the walls 18 and 20 and the surfaces of the wall 16. The inside surfaces of walls 18 and 20 are preferably slanted at the same angle as the flared portion 16 of the side wall 10. Preferably this angle is between 7 and 13° from the vertical. Ideally I slant the flared portion 16 between about 10-12°. At one end of the seal is a tab 21 which provides a positive grip for stripping the seal from the wall 10.

The tray, generally referred to by numeral 22, includes a substantially flat bottom portion 23 having raised ridges 24 which extend substantially the entire length of the tray as shown in FIGURE 4 and an upstanding peripheral rim 25 to which is attached an inverted V-shaped handle 26 and a circular handle 27. The handles 26 and 27 are located at opposite ends of the tray and are flexible such that they can be moved from the solid line position to the dash line positions shown in FIGURE 4. Preferably the tray includes a downwardly extending leg 28 at each of its ends which is positioned to seat near the juncture of the walls 11 and 10 of the keeper and immediately above the central raised portion of wall 11.

Preferably the top seal is fabricated from regular polyethylene and therefore has a resilient flexibility and yieldability which insures sealing of he walls 18 and 20 about the flared portion 16 of the side wall 10. The construction of the seal and wall is illustratively described in Tupper U.S. Patent 2,487,400. The keeper walls 10 and 11 are preferably fabricated from linear polyethylene thereby giving them rigidity with a minimum flexibility.

The tray 22 is preferably fabricated from linear polyethylene, but such materials as polypropylene can also be used so long as the handles 26 and 27 have a flexibility as herein described.

It is within the scope of this invention that the keeper and tray can be fabricated from any known plastic materials so long as the seal 17 effectively and tightly engages the top edge of the wall 10 and the tray 22 is nondeformable when hot perishables are placed upon the tray.

In use, the sealed keeper and tray containing a perishable is removed from a refrigerator; the top seal is removed by pulling upward on tab 21, and tray 22 is lifted out from the keeper by grasping the handles 26 and 27.

The perishable on tray 22 may be carved thereon without removal to a cutting board.

While I have described the present preferred embodiment of my invention, it may be otherwise embodied within the scope of the following claims.

I claim:

1. An oval container and tray therefor, said tray fabricated from plastic and used for storing perishables in a cool atmosphere; comprising a hollow container having side and bottom walls with an open top, the upper edge of the walls being outwardly disposed between about 7°–13° from the vertical; a seal enclosing the open top of the container, said seal including a central substantially flat wall and a peripheral U-shaped sealing rim, the rim being positionable over the upper edge of the side wall of the container with the open side of the U downward to tightly and resiliently engage the side wall thereby sealing the open top of the container; the legs of the U-shaped rim being disposed at an angle substantially conforming to the angle of disposition of the upper edge of the container; a rigid plastic tray positionable in the container, said tray having supporting legs in engagement with the bottom wall of the container so as to space said tray from the bottom of said container; said tray including a substantially flat tray base having an upstanding rim extending around the periphery of said base and an integral upstanding non-pivoted handle at each end of the tray, said handles extending upwardly from said upstanding peripheral rim at each end of said tray to be easily grasped by the user in removing the tray from the container, each handle further being formed of an elongated flexible member, the ends of said elongated member being spaced apart so as to permit outward flexure of said handles.

2. A container and tray according to claim 1 wherein the upper edge of the side walls are outwardly disposed between about 10°–12° from the vertical.

References Cited in the file of this patent

UNITED STATES PATENTS

| | | |
|---|---|---|
| 1,187,498 | Castle | June 20, 1916 |
| 1,998,944 | Spake | Apr. 23, 1935 |
| 2,051,940 | Chichester-Miles | Aug. 25, 1936 |
| 2,487,400 | Tupper | Nov 8, 1949 |
| 2,661,567 | Paege | Dec. 8, 1953 |
| 2,752,970 | Tupper | July 3, 1956 |
| 2,765,832 | Tupper | Oct. 9, 1956 |
| 2,851,188 | Pavelle | Sept. 9, 1958 |
| 2,866,575 | Lattuca | Dec. 30, 1958 |
| 2,954,893 | Sayre | Oct. 4, 1960 |

FOREIGN PATENTS

| | | |
|---|---|---|
| 524,044 | Great Britain | July 29, 1940 |